(12) United States Patent
Wynn

(10) Patent No.: US 6,313,738 B1
(45) Date of Patent: Nov. 6, 2001

(54) ADAPTIVE NOISE CANCELLATION SYSTEM

(75) Inventor: Woodson Dale Wynn, Basking Ridge, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/871,297

(22) Filed: Jun. 9, 1997

(51) Int. Cl.[7] .................................................. H04M 11/04
(52) U.S. Cl. .............................. 340/310.03; 340/310.01; 340/310.02; 340/310.07; 375/297
(58) Field of Search ................... 340/310.01–310.08, 340/870.18, 870.39; 375/220, 254, 296

(56) References Cited

U.S. PATENT DOCUMENTS

| | | | |
|---|---|---|---|
| 4,344,150 | 8/1982 | McLaughlin | 702/195 |
| 5,278,777 | 1/1994 | Cummins | 708/310 |
| 5,870,016 | * 2/1999 | Shrestha | 340/310.02 |
| 6,041,250 | * 3/2000 | DePinto | 600/509 |

OTHER PUBLICATIONS

Jin–Der Wang et al.: "Adaptive Harmonic Noise Cancellation with an Application to Distribution Power Line Communications", IEEE Transactions on Communications, US, IEEE Inc. New York, vol. 36, No. 7, p. 875–883.

"Adaptive Harmonic Noise Cancellation with an Application to Distribution Power Line Communications", by J. Wang et al., IEEE Transactions on Communications, vol. 36, No. 7, Jul. 1988, NY, pp. 875–883.

* cited by examiner

*Primary Examiner*—Daryl Pope

(57) ABSTRACT

A power line adaptive noise cancellation system receives noise signals from house power lines and adaptively cancels the received noise from a power line input signal. The system includes a power line input signal receiver, at least one power line noise signal receiver and an adaptive noise cancellation device. The input signal and the noise signals are bandpassed filtered and demodulated by a local oscillator to generate baseband signals for both the input signal as well as the noise signals. The noise signals are input into adaptive filters that filter the noise signal based on a set of adaptive weights. The output of the adaptive filters are subtracted from a delayed baseband input signal to generate a received input signal. The received input signal is also fed back to the adaptive filters for updating adaptive weights of the adaptive filters.

16 Claims, 7 Drawing Sheets

ADAPTIVE NOISE CANCELLATION SYSTEM

BACKGROUND OF THE INVENTION

1. Field of Invention

This invention relates to eliminating house noise from received power line network signals.

2. Description of Related Art

Power line communication systems transmit and receive information using conventional power lines that supply power to houses. Such systems use blocking circuits to block noise generated within the house by devices such as home appliances. However, the blocking circuits are imperfect due to finite impedances of the inductive elements and limited sizes of the shunt capacitors used in the blocking circuits. Thus, there is a need in power line communication systems to further reduce the effect of house noise from interfering with power line communications.

SUMMARY OF THE INVENTION

A power line adaptive noise cancellation system reduces house noise from interfering with power line communication systems by receiving noise signals from house power lines and adaptively canceling the received noise signals from a power line input signal. The system includes a power line input signal receiver, at least one power line noise signal receiver and an adaptive noise cancellation device. The input signal and the noise signals are bandpass filtered and demodulated by a local oscillator frequency to translate to baseband both the input signal and the noise signals in a selected frequency band of interest. The noise signal is input into an adaptive filter that filters the noise signal based on a set of adaptive weights. The output of the adaptive filter is subtracted from the delayed total baseband input signal plus noise to generate a received filtered input signal. The received filtered input signal is input into a baseband receiver and also fed back as a residual error to the adaptive filter for updating the filter adaptive weights.

BRIEF DESCRIPTION OF THE DRAWINGS

The invention is described in detail with reference to the following figures wherein like numerals reference like elements, and wherein.

DETAILED DESCRIPTION OF PREFERRED EMBODIMENTS

Figure 1:
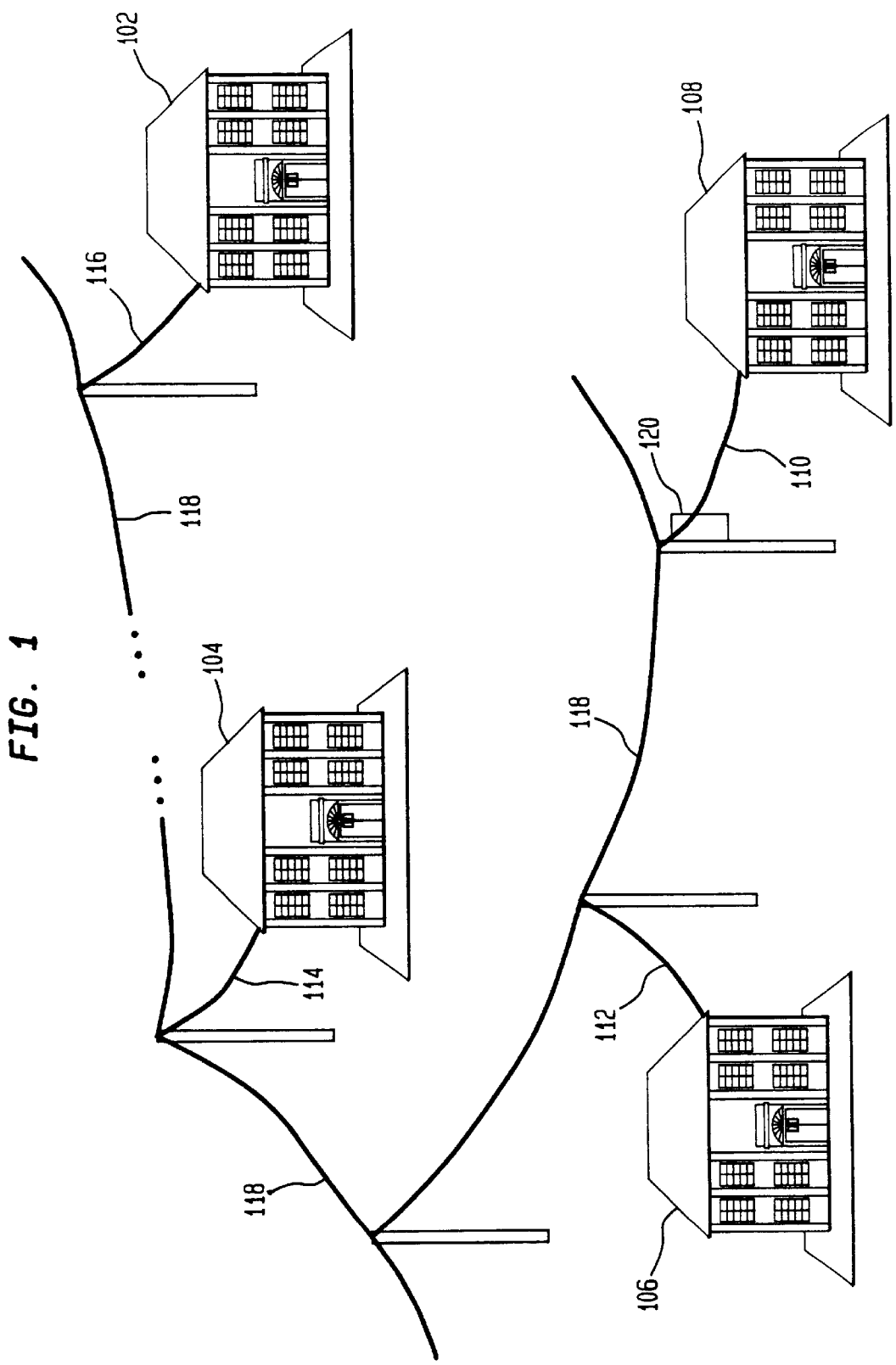
FIG. 1 is a diagram of power line connection among houses.

FIG. 1 shows houses 102, 104, 106 and 108 that are interconnected by power lines 118 through power line extensions 110, 112, 114 and 116. These power lines 118, 110, 112, 114 and 116 receive power from a power transformer 120 which in turn receives power from high voltage lines.

Figure 2:
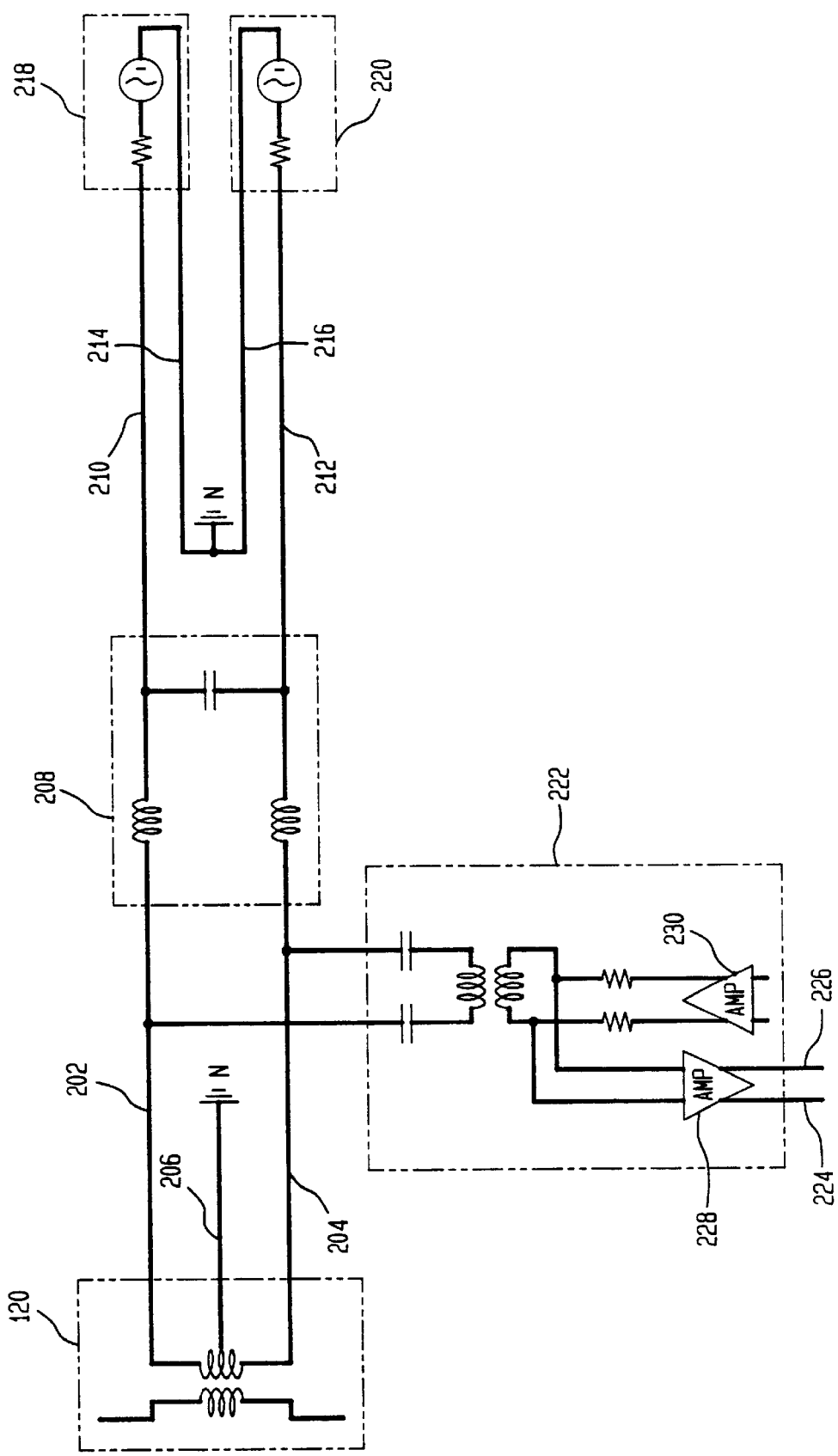
FIG. 2 is a circuit diagram of a power line transmitter/receiver interfaced to the power line side of a residence noise blocking circuit.

FIG. 2 shows a circuit diagram of a power line connection for the house 102, for example. The power transformer 120 outputs power through two power lines 202 and 204 as well as a neutral line 206 which is grounded to earth. The power lines 202 and 204 are connected to power lines 210 and 212 within the house 102 through a blocking circuit 208. The power supplied by the power lines 210 and 212 is about 220 volts AC. A neutral point 211 is provided in the house 102 through a grounding wire and the neutral point is wired throughout the house 102 as neutral lines 214 and 216. The power between power line 210 and neutral line 214 is about 110 volts AC and similarly the power between power line 212 and neutral 216 is about 110 volts AC. Noise sources 218 and 220 represent noise generated by devices such as home appliances that are connected across power lines 210, 212 and neutral lines 214, 216, respectively.

A power line transmitter/receiver 222 is connected on the power transformer side of the house blocking circuit 208. The power line transmitter/receiver 222 is coupled to the power lines 202 and 204 through two coupling capacitors and an impedance matching transformer. The transmitter amplifier 230 and receiver buffer amplifier 228 are connected across the impedance transformer. The receiver 228 and transmitter 230 have differential inputs and differential signal outputs as for example signal lines 224 and 226.

Figure 3:
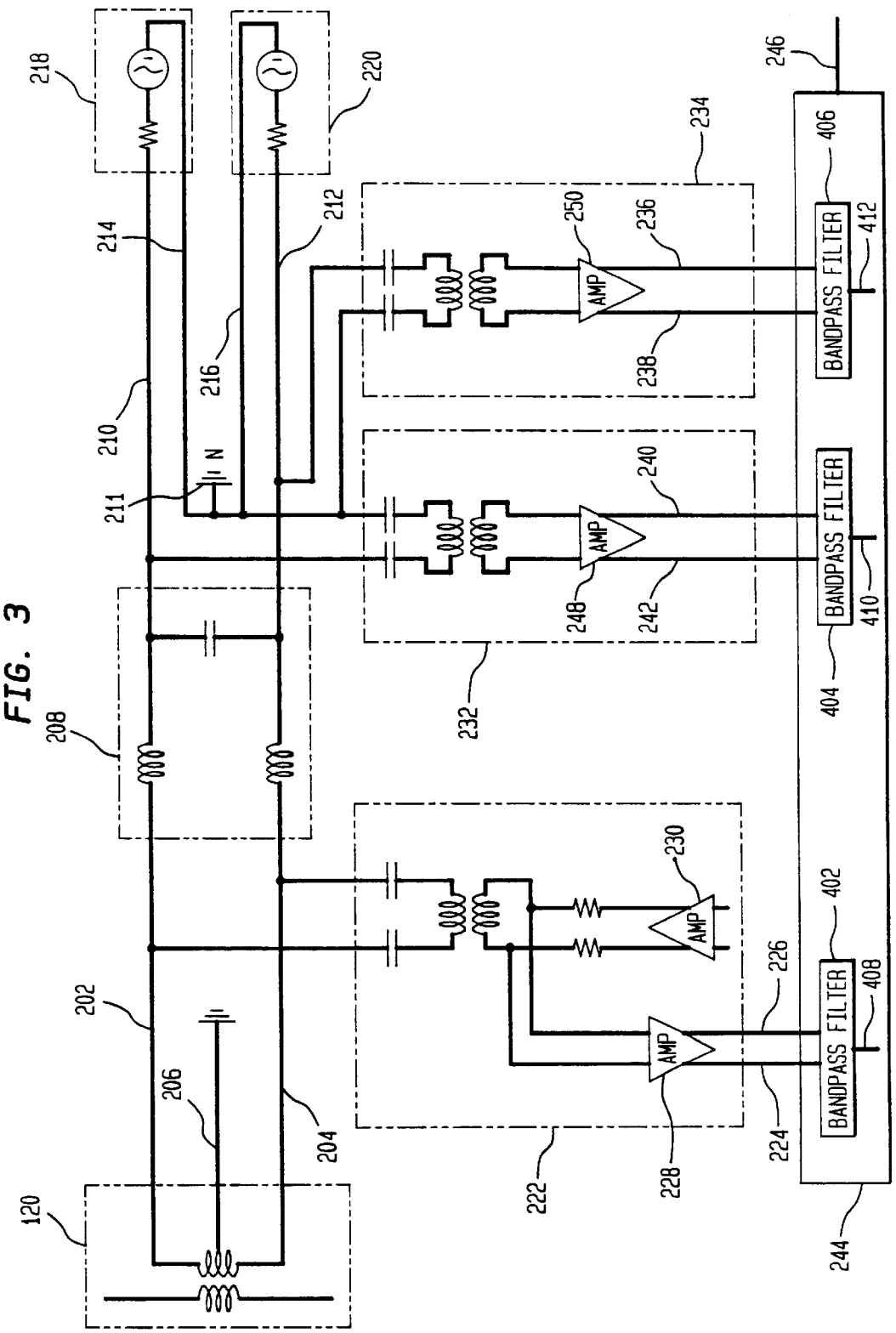
FIG. 3 is a circuit diagram of a power line adaptive noise cancellation system.

FIG. 3 shows a circuit diagram of a power line adaptive noise cancellation system 200. For this exemplary embodiment, the power line adaptive noise cancellation system 200 includes two noise receivers 232 and 234. Since the power system into the house 102 is unbalanced, both noise references between 210 and the neutral point 211 and between 212 and the neutral point 211 are needed. The number of noise receivers is determined by the number of phases entering the residence. In this discussion, there are two noise receivers.

The noise receivers are coupled to the power lines 202 and 204 at the house side of the blocking unit 208 and the neutral lines 214 and 216 via coupling capacitors and impedance match transformers similar to that described above for the signal transmitter/receiver 222. Noise receiver amplifiers 248 and 250 differentially amplify the noise signals and output the amplified noise signals through differential output line pairs 242, 240 and 238, 236 corresponding to the noise signal receivers 232 and 234, respectively. The outputs of the input signal receiver 222 and the noise receivers 232 and 234 are input to an adaptive noise cancellation device 244 which processes the input signal and the noise signals and outputs a filtered desired signal on a line 246.

The power line adaptive noise cancellation system 200 cancels noise in an input signal received from the power lines 202 and 204 by adjusting and subtracting the noise signals received by the noise receivers 232 and 234 from the input signal received by the power line transmitter/receiver 222. However, the received noise signals cannot be directly subtracted from the input signal because the transmission functions that couple the noise signals to the power lines 202 and 204 are complex and generally cause time dependent frequency variations. Thus, the noise signals are removed from the input signal as described below.

Power line communication systems may use a band of frequencies such as 10–30 MHz to transmit/receive information. This frequency band is divided into smaller frequency bands in a method called frequency division multiplexing (FDM) so that multiple channels may be established where the channels may transmit information independently of other channels. Thus, any particular receiver may transmit and receive information through one channel of the FDM frequency band.

Because the frequency variation of the power line RF signal paths between the noise measurement points and the power line measurement points of the input signal transmitter/receiver 222 can be very complex over the FDM band, cancellation of the noise signals from the input signal is most advantageously applied to each channel of the FDM band. Thus, the adaptive noise cancellation device bandpasses the input signal and the noise signals using bandpass filters 402, 404 and 406 to select one of the desired channels of the FDM to the band.

Figure 4:
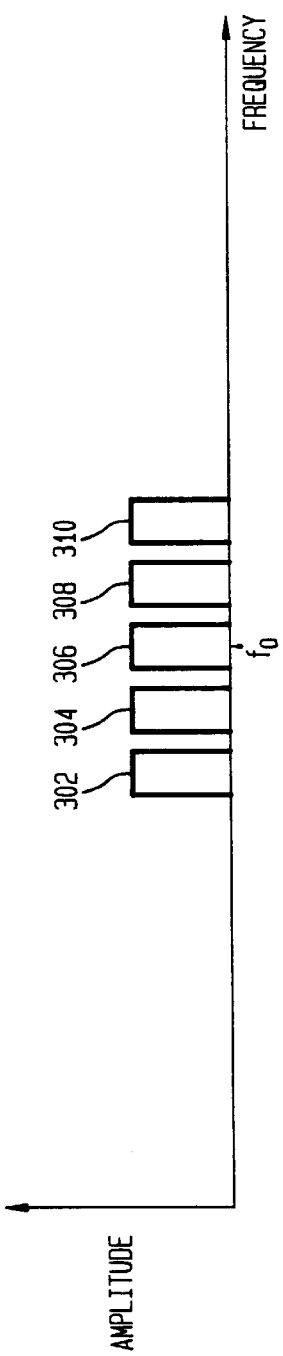
FIG. 4 is a diagram of frequency bands of a frequency division multiplexing system.
Figure 5:
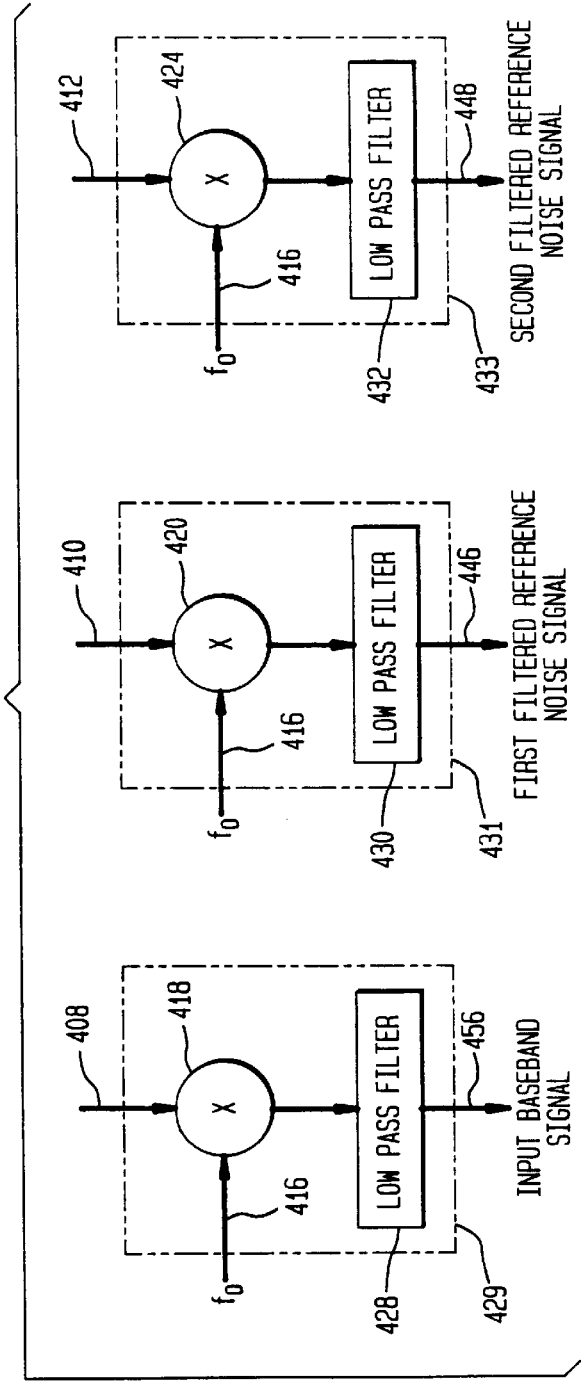
FIG. 5 is a diagram of signal and noise demodulators with low pass filters.

FIG. 4 shows an example of frequency bands that may be used in an FDM communication system. Frequency channels 302, 304, 306, 308 and 310 are typically positioned in a contiguous non-overlapping arrangement in the frequency domain. Each of the channels has a center frequency such as $f_0$ for channel 306. To receive an input signal through channel 306, the output of the bandpass filter from output signal line 408 is demodulated and lowpass filtered.

The bandpass filter 402 maybe a signal acoustic wave (SAW) filter. SAW filters can be made highly selective to reject adjacent FDM channels such as channels 304 and 308. Bandpass filters 404 and 406 do not need such high selectivity as long as they select the noise signals correlated with noise in the desired filtered signal band and reasonably suppress out-of-band components. Thus, less expensive bandpass filters may be used as bandpass filters 404 and 406.

Demodulators 428, 431 and 433 receive the bandpass filter outputs through signal lines 408, 410 and 412 and mix the bandpassed signals using mixers 418, 420 and 424, respectively, with an oscillator output at frequency $f_0$ through line 416. The output of the mixers 418, 420 and 424 are filtered by lowpass filters 428, 430 and 432 and output as a baseband signal 456, a first noise baseband signal 446 and a second noise baseband signal 448, respectively.

Figure 6:
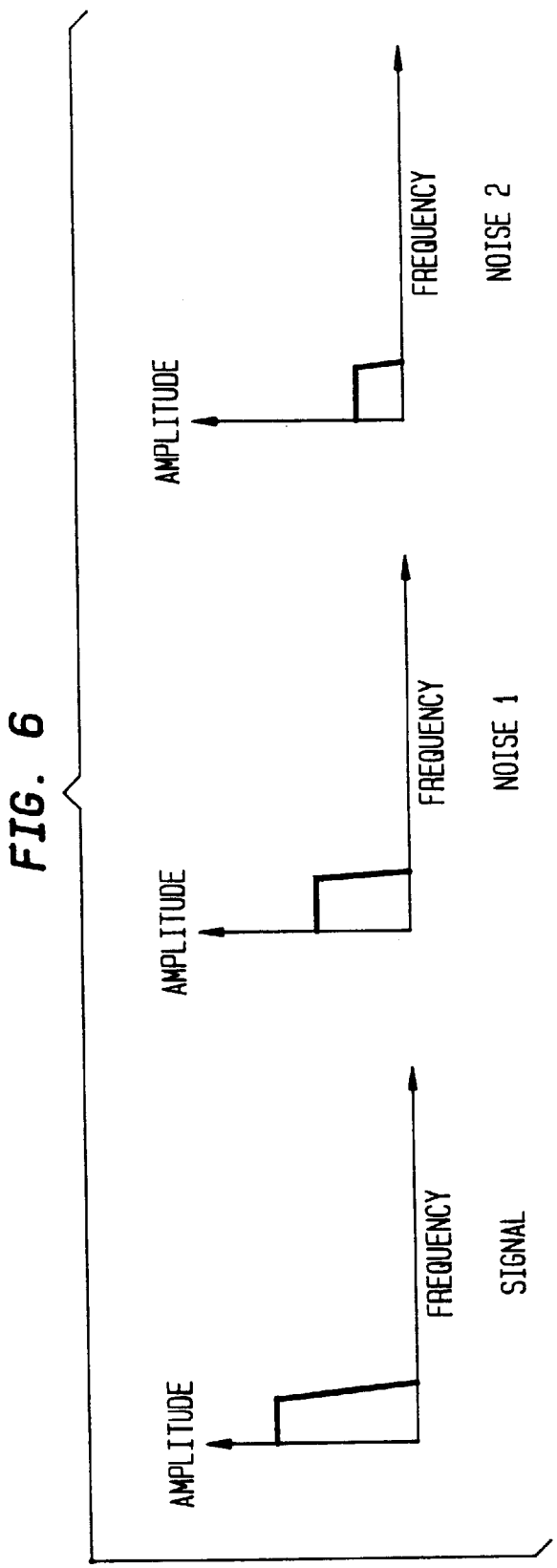
FIG. 6 is a diagram of typical baseband signal and noise spectra.

FIG. 6 shows an example of the frequency domain amplitude spectra diagrams for the input baseband signal, the first noise baseband signal and the second noise baseband signal. The input signal can contain noise components that are correlated with the first and second noise baseband signals because the first and second noise baseband signals are not entirely blocked by the blocking circuit 208 and hence appear on power lines 202 and 204. Thus, to improve the powerline transmitter/receiver performance, contributions of the first and second noise baseband signals 446 and 448 should be subtracted out of the input baseband signal 456.

Figure 7:
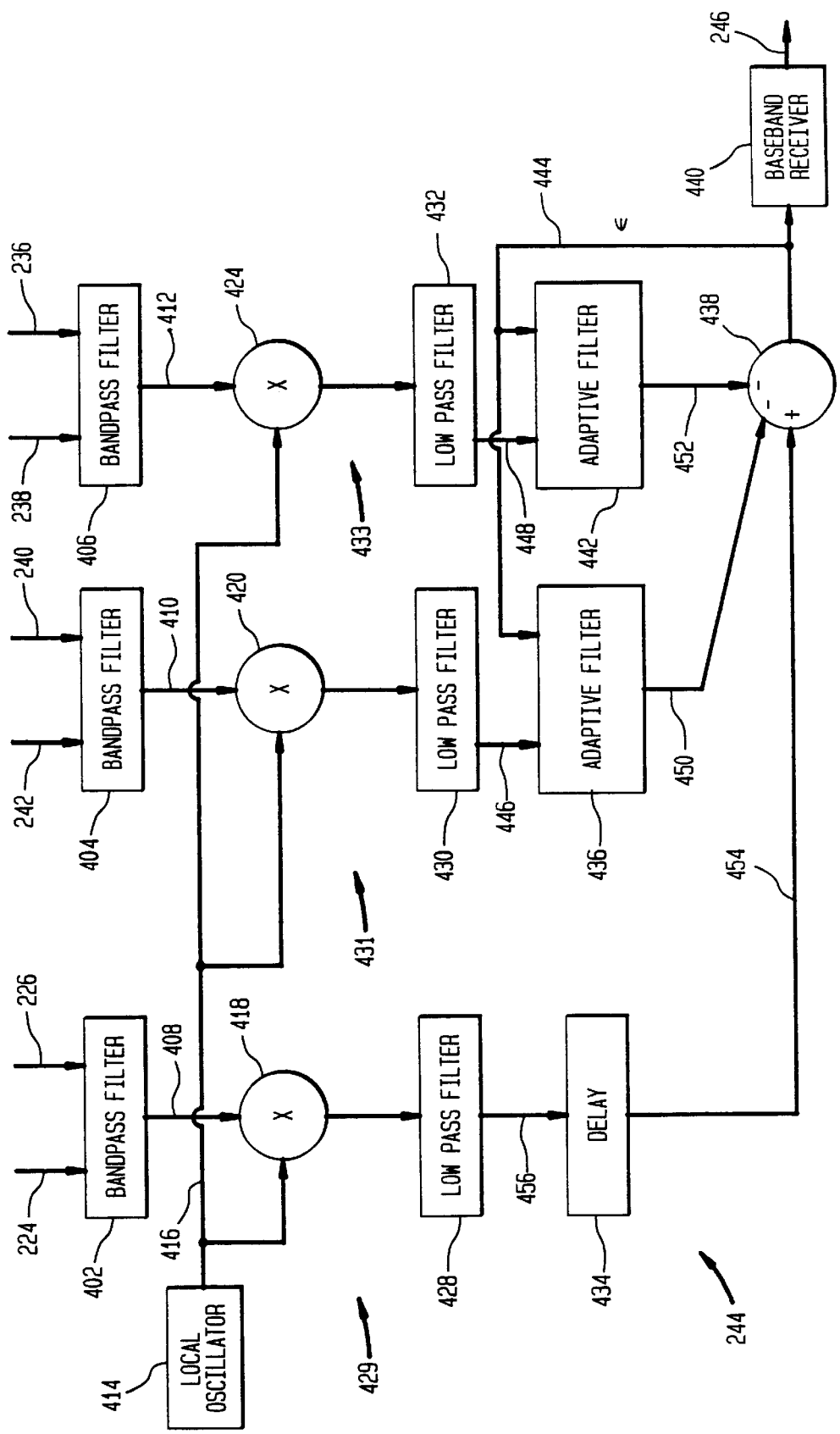
FIG. 7 is a diagram of an adaptive noise cancellation device.

FIG. 7 shows a least mean square LMS-form of adaptive noise cancellation device 244 in detail. The noise cancellation could have other forms such as recursive least squares (RLS), but the objective is the same. The outputs of the demodulators 431 and 433 are input into two adaptive filters 436 and 442. The filters 436 and 442 adaptively filter the first and second noise baseband signals. The adaptive filter outputs are subtracted from the input baseband signal 454 by the summer 438. The LMS filter weights are adjusted using the error $\epsilon$ and inputs the first and second noise baseband signals 446 and 448 to reduce the minimum-mean-square noise in the output error 444.

Because devices in the house 102 such as televisions and kitchen appliances may be turned on or off at unpredictable times, even if the exact frequency variations caused by the various power lines from the noise sources to the power line input receivers are known, it would be difficult to determine the proper filtering at any particular moment. Thus, the adaptive filters 436 and 442 must continuously update adaptive weights based on an error signal so that the adaptive filters 436 and 442 may adjust the contributions of first and second noise baseband signals in 454 to minimize the noise induced error signal. As shown in FIG. 7, the error signal is the output of the summer 438 which is fed back to the adaptive filters 436 and 442 through signal line 444.

Since the adaptive filters 436 and 442 involve complex processes which require time to perform, the input baseband signal output by the input baseband demodulator 429, must be delayed by a delay unit 434 before input into the summer 438 through signal line 454. Thus, the delay unit 434 matches in time the signal output by the input baseband demodulator relative to the time of the first and second noise baseband signals output by the adaptive filters 436 and 442. The output of the summer 438 is the received input signal which is also the error signal fed back to the adaptive filters 436 and 442.

The received input signal is input into the baseband receiver 440. If the baseband receiver 440 is a digital receiver, the received input signal is decoded and translated into received data, 1's and 0's, that was transmitted by the original transmitter. The decoded digital signal is output by the adaptive noise cancellation device 244 to other processing functions through signal line 246.

Figure 8:
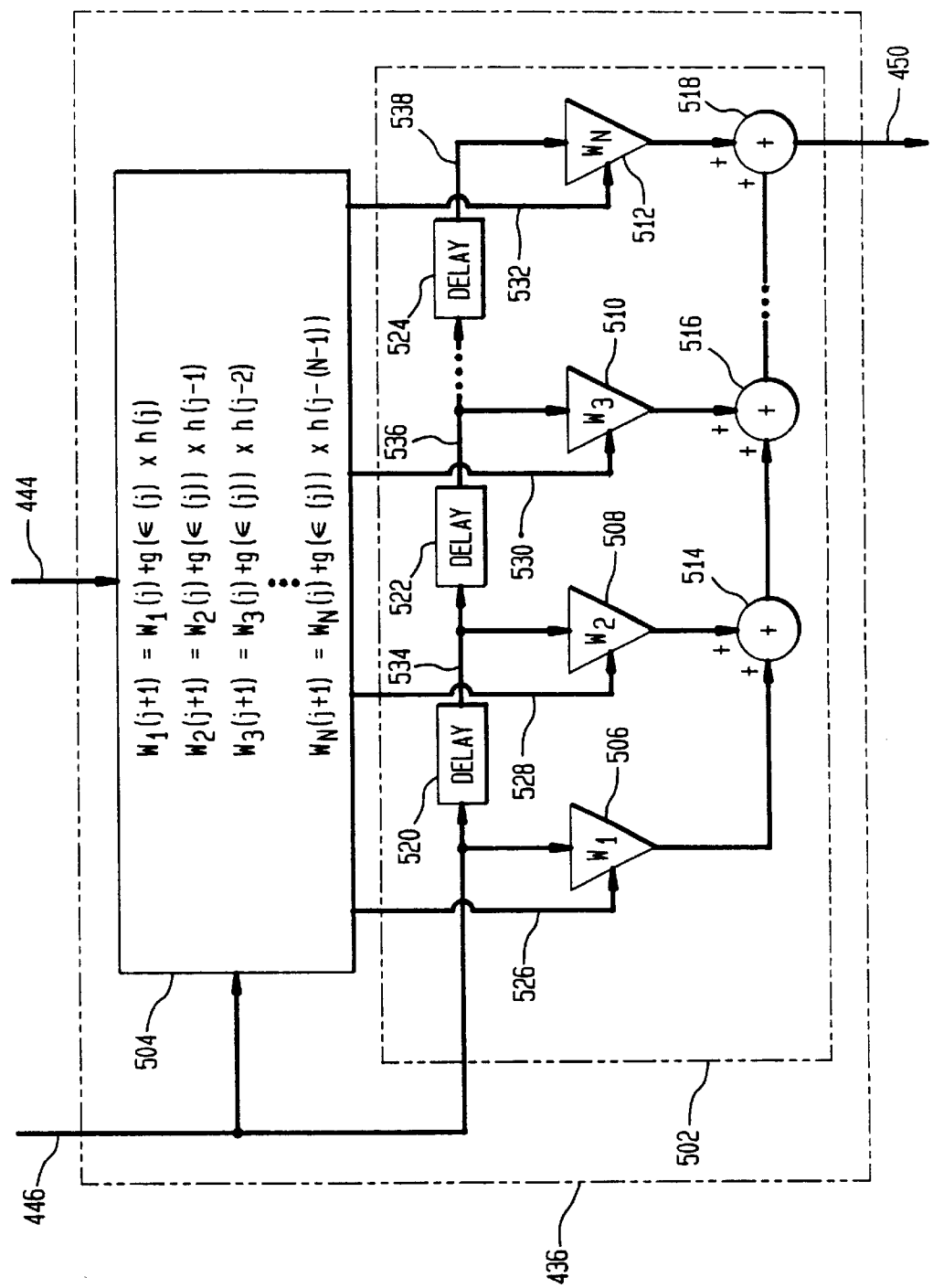
FIG. 8 is a diagram of an adaptive filter.

FIG. 8 shows an exemplary embodiment of the adaptive filter 436 in greater detail. While different adaptive filters may be used, FIG. 8 shows a finite-impulse-response (FIR) least-mean square-error (MMSE) adaptive filter. The filter portion 502 receives the first noise baseband signal from signal line 446 and delays the first noise baseband signal by delay units 520, 522 and 524. As indicated by the dotted portion of signal line 536, any number of delay units 520, 522 and 524 may be used depending on a particular design of the least mean square adaptive filter. If the adaptive filter is a digital adaptive filter the delay units 520, 522 and 524 delay the first noise baseband signal by some integer fraction of one symbol unit time Ts. Thus the delay unit is Ts/K for some integer K=1,2,3 depending on implementation requirements. This is a fractionally spaced equalizer.

The delay units 520, 522 and 524, multiplier units 506, 508, 510 and 512 and adder units 514, 516 and 518 together form a filter that filters the first noise baseband signal and outputs the filtered first noise baseband signal through signal line 450. The filter characteristics are determined by the weights $W_1, W_2, W_3, \ldots W_M$, where M is the length of the filter. Depending on the particular values of the weights, the frequency characteristic of the filter may be changed.

The weights $W_1, W_2, \ldots W_M$ are adaptive weights. The adaptive weights are updated and the updated weights are used by the multipliers 506, 508, 510 and 512 as indicated by the lines connecting a weight update unit 504 and the multipliers 506, 508, 510 and 512.

The weight update unit 504 calculates new weights based on the current set of weights adjusted by a factor which is a product of a constant g multiplied by the error signal $\epsilon(j)$ multiplied by the first noise baseband signal $h(j)$, where j is the current time. The constant g is selected so that the weight update algorithm converges to generate an optimum set of weights $W_1, W_2 \ldots W_M$ that results in the best removal of the first noise baseband signal from the input baseband signal within the constraint of adaptivity to changing system conditions. The error signal $\epsilon(j)$ is the output of the summer 438 which is also the received baseband signal to be detected. The first noise baseband signal $h(j)$ is delayed corresponding to the total number of delays applied to the first noise baseband signal by delay units 520, 522 and 524. Thus, the first noise baseband signal used to update $W_1$ is an undelayed first noise baseband signal $h(j)$. $W_2$ is updated by using the first noise baseband signal delayed by the delay unit 520, and so on. The weight update unit 504 generates weights adaptively to minimize the mean square error component of noise h present in output $\epsilon(j)$ and thus achieves a received input signal having a maximized signal-to-noise ratio at the input of receiver 440.

While this invention has been described in conjunction with specific embodiments thereof, it is evident that many alternatives, modifications and variations would be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A power line adaptive noise cancellation system, comprising:
   a power line input signal receiver which is coupled to a plurality of power lines, wherein an input signal is received over at least the one of the power lines;
   at least one power line noise signal receiver which is coupled to one of the power lines and a neutral line;
   an adaptive noise cancellation device coupled to the input signal receiver and the noise signal receiver, the adaptive noise cancellation device canceling at least one noise signal received by the noise signal receiver from an input signal received by the input signal receiver,
   wherein the adaptive noise cancellation device comprises:
      an input signal filter that filters the input signal to select a selected frequency band;
      a baseband signal generator that converts the filtered input signal to a baseband signal;
      at least one noise signal filter that filters the noise signal to select noise in the selected frequency band;
      at least one noise baseband signal generator that converts the filtered noise signal to at least one baseband noise signal;
      a baseband signal delay device that delays the baseband signal to generate a delayed baseband signal that is time positioned relative to the baseband noise signal; and
      an adaptive filter that adaptively subtracts the baseband noise signal from the delayed baseband signal.

2. The system of claim 1, wherein the input signal filter is a band pass filter.

3. The system of claim 2, wherein the band pass filter is a surface acoustic wave filter.

4. The system of claim 1, wherein the baseband signal generator comprises:
   an input signal demodulator that demodulates the filtered input signal into a demodulated input signal; and
   an input signal low pass filter that filters the demodulated input signal to generate the baseband signal.

5. The system of claim 1, wherein the noise baseband signal generator comprises:
   at least one noise signal demodulator that demodulates the filtered noise signal into a demodulated noise signal; and
   at least one noise signal low pass filter that filters the demodulated noise signal to generate the baseband noise signal.

6. The system of claim 1, wherein the adaptive filter subtracts the baseband noise signal from the delayed baseband signal based on an error metric.

7. The system of claim 6, wherein the error metric is a least mean squared error metric.

8. A method for operating a power line adaptive noise cancellation system, the method comprising:
   receiving an input signal from a power line input signal receiver which is coupled to a plurality of power lines, wherein the input signal is received over at least the one of the power lines;
   receiving at least one noise signal from at least one power line noise signal receiver lines and a neutral line; and
   canceling the noise signal of the one of the power lines from the input signal using an adaptive noise cancellation device,
   further comprising:
      filtering the input signal to select a selected frequency band of the input signal;
      converting the filtered input signal to a baseband signal;
      filtering the noise signal to select noise in the selected frequency band;
      converting the filtered noise signal to at least one baseband noise signal;
      positioning the baseband signal relative to the baseband noise signal by delaying the baseband signal; and
      subtracting the baseband noise signal from the delayed baseband signal.

9. The method of claim 8, wherein the input signal is filtered using a band pass filter.

10. The method of claim 9, wherein the band pass filter is a surface acoustic wave filter.

11. The method of claim 8, further comprising:
    demodulating the filtered input signal into a demodulated input signal; and
    filtering the demodulated input signal to generate the baseband signal.

12. The method of claim 8, further comprising:
    demodulating the filtered noise signal into demodulated noise signals; and
    filtering the demodulated noise signal to generate the baseband noise signal.

13. The method of claim 8, wherein the subtracting step subtracts the baseband noise signal from the delayed baseband signal based on an error metric.

14. The method of claim 13, wherein the error metric is a least mean squared error metric.

15. The method of claim 8, wherein the baseband noise signal is subtracted from the delayed baseband signal by an adaptive filter.

16. The method of claim 15, wherein the adaptive filter is a least mean square adaptive filter.

* * * * *